May 20, 1958
L. BODDY
2,835,885
THERMAL RESPONSIVE GAUGING SYSTEM
Filed Aug. 5, 1949
5 Sheets-Sheet 1
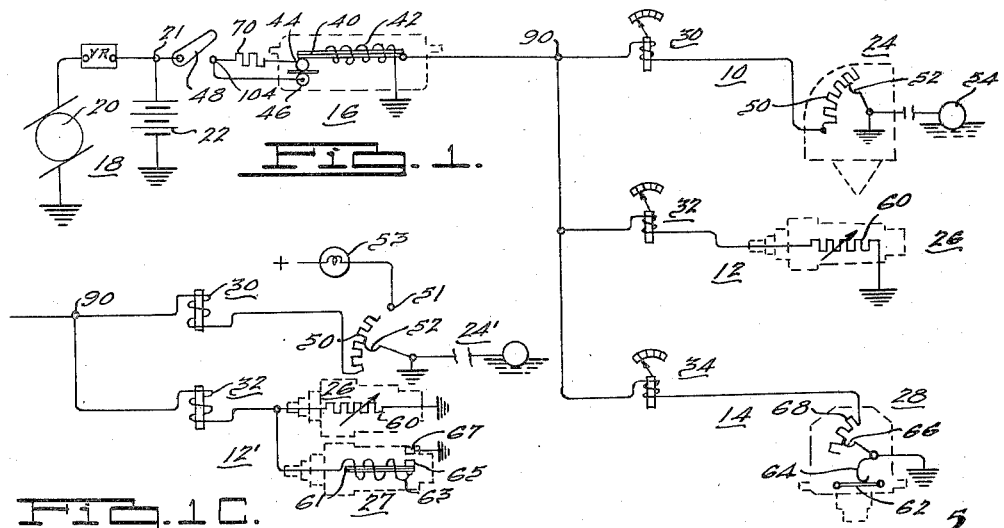
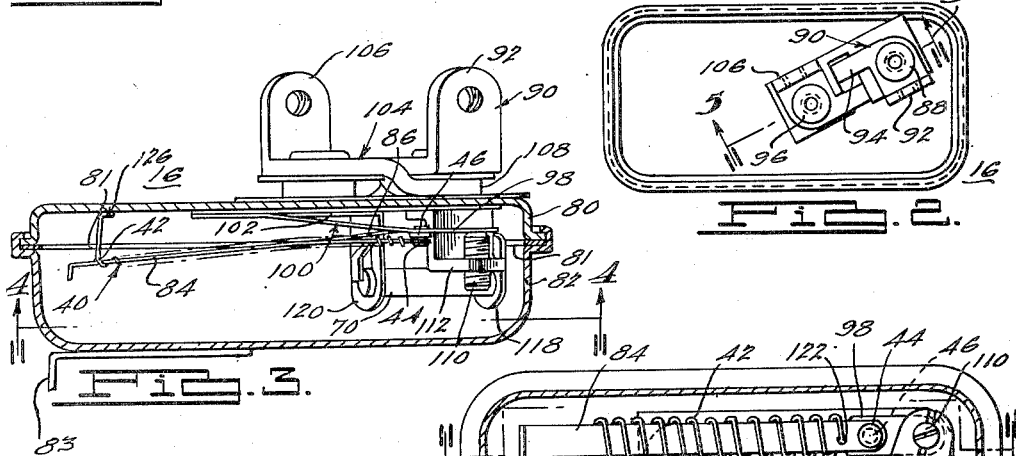
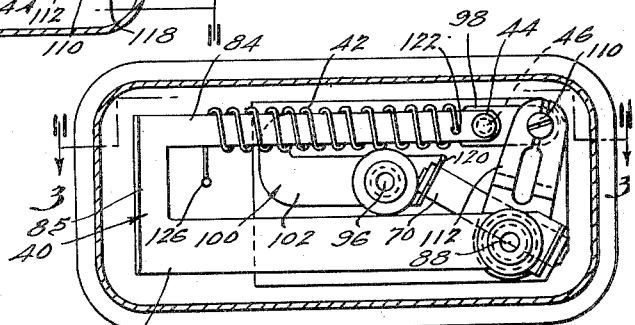
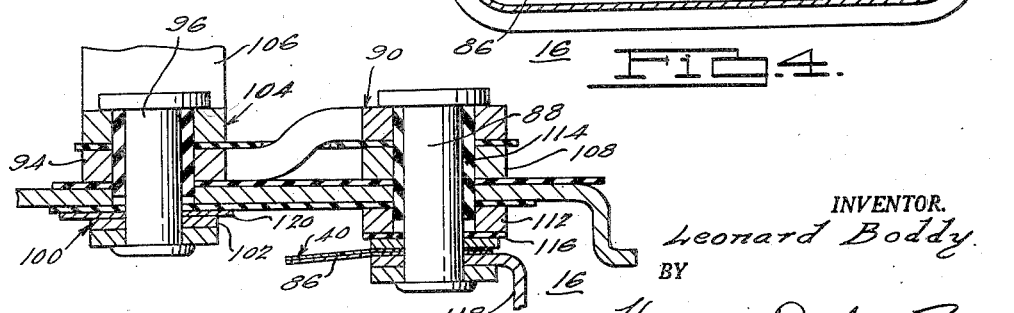
INVENTOR.
Leonard Boddy
BY
Harness, Dickey & Pierce
ATTORNEYS.

May 20, 1958 L. BODDY 2,835,885
THERMAL RESPONSIVE GAUGING SYSTEM
Filed Aug. 5, 1949 5 Sheets-Sheet 2
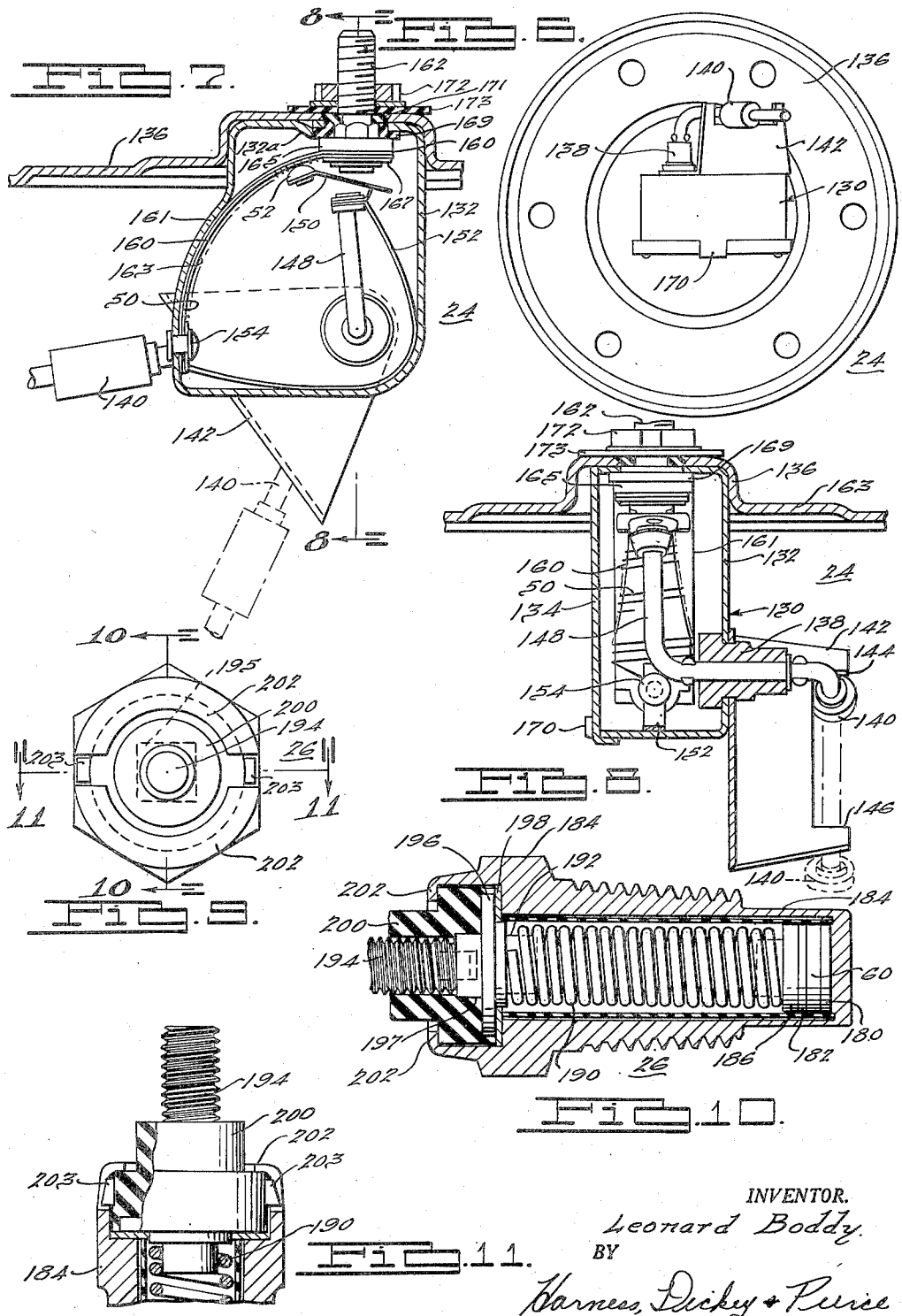
INVENTOR.
Leonard Boddy
BY
Harness, Dickey & Pierce
ATTORNEYS.

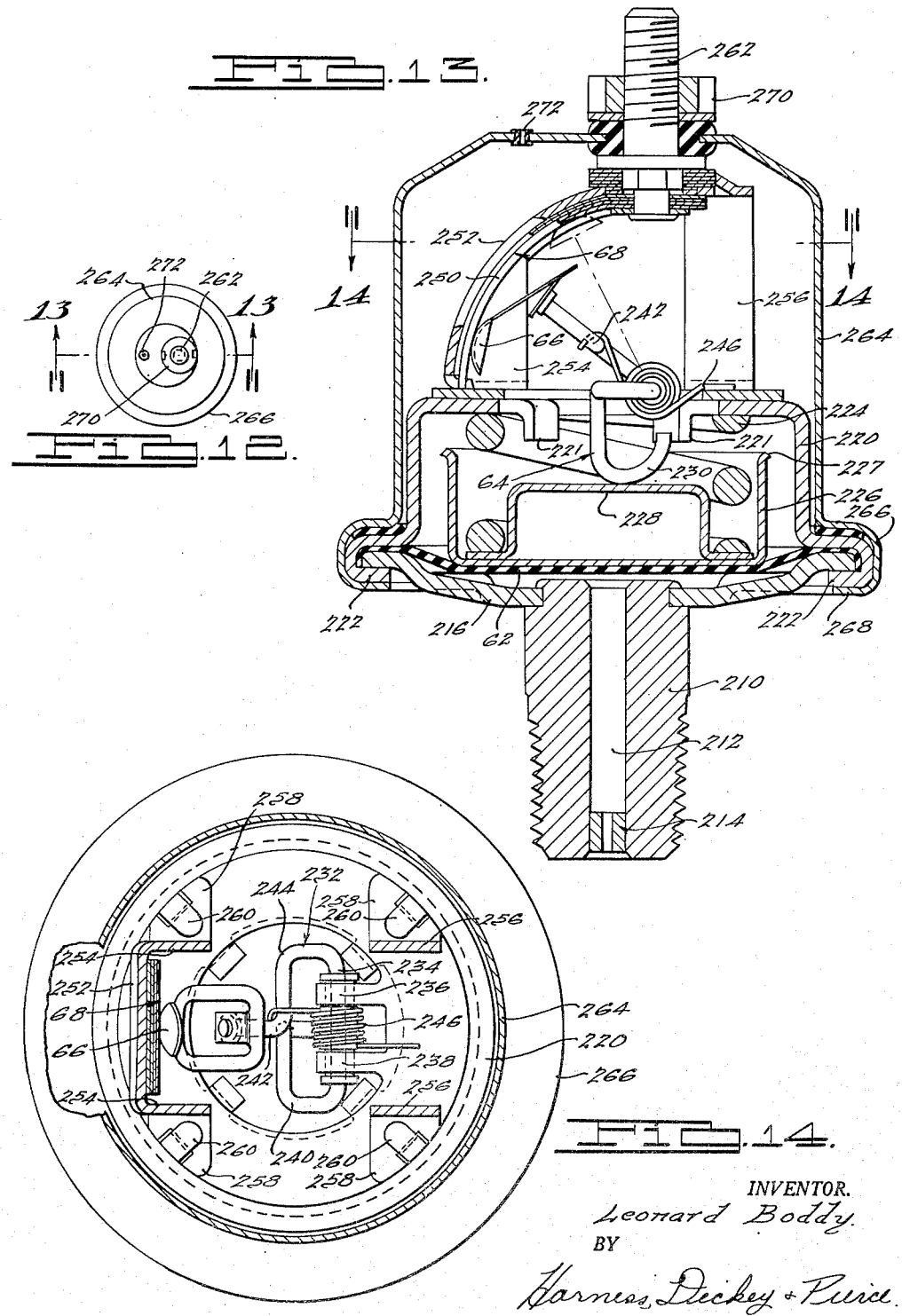

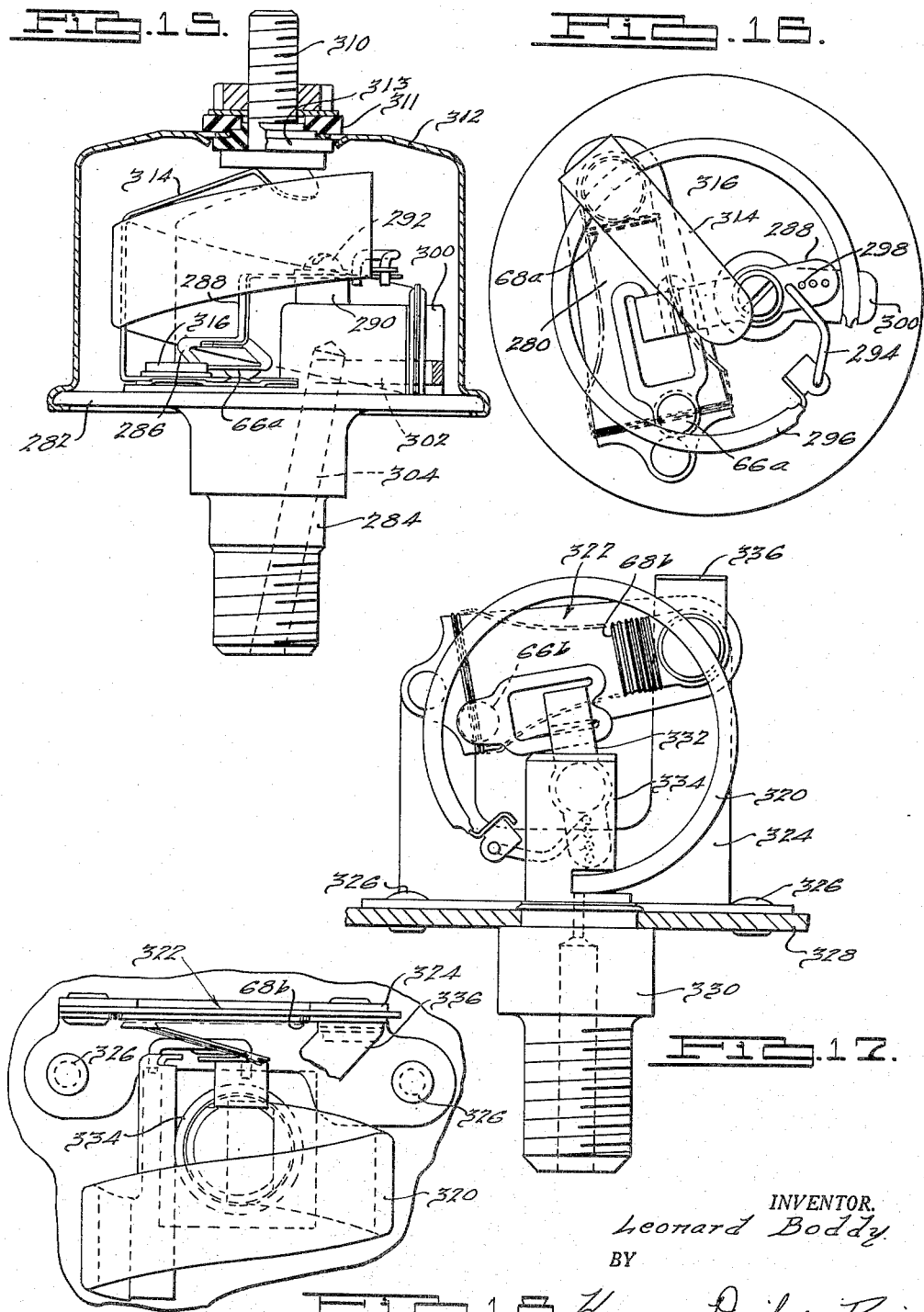

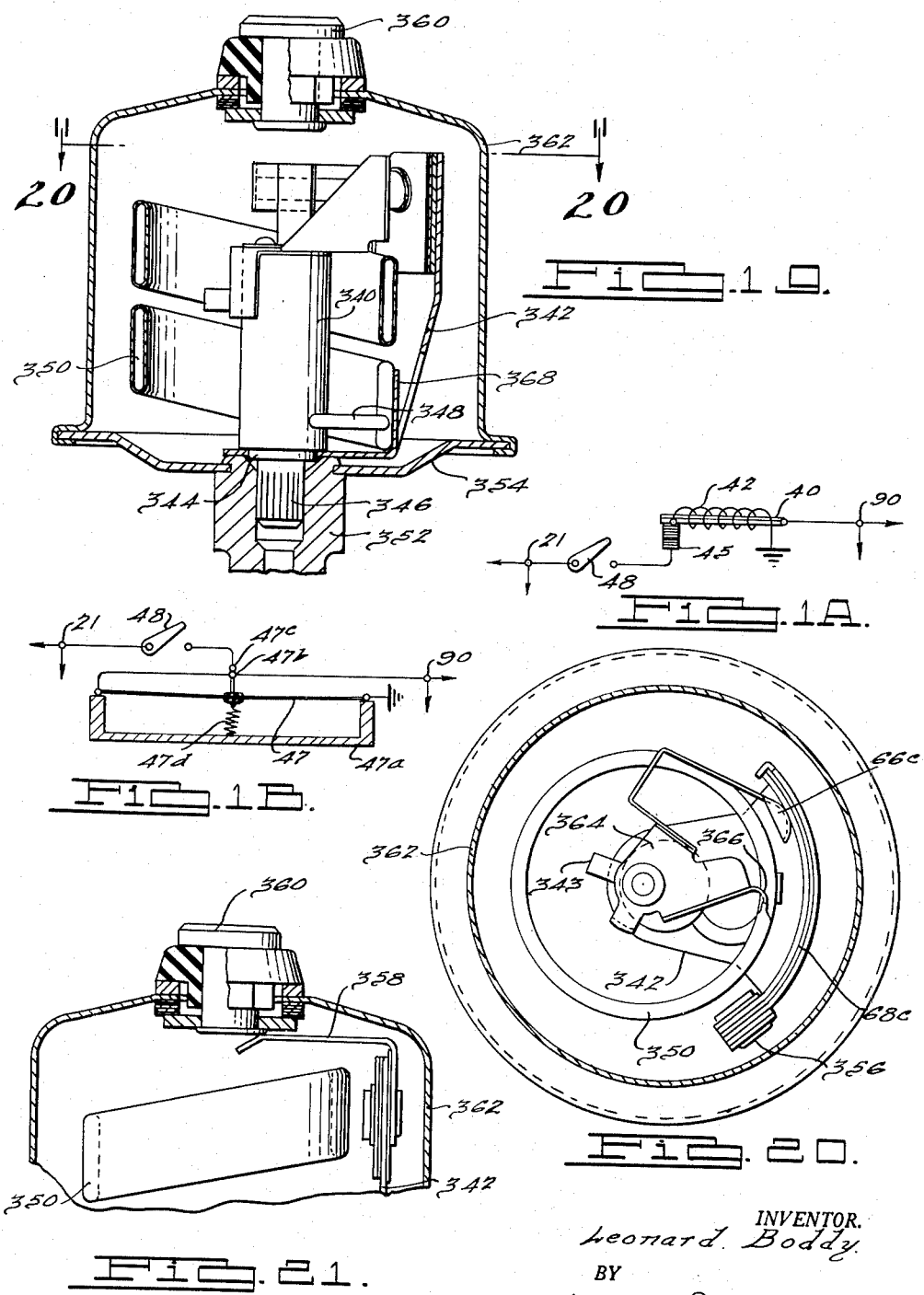

United States Patent Office

2,835,885
Patented May 20, 1958

2,835,885

THERMAL RESPONSIVE GAUGING SYSTEM

Leonard Boddy, Ann Arbor, Mich., assignor to King-Seeley Corporation, Ann Arbor, Mich., a corporation of Michigan Application August 5, 1949, Serial No. 108,773

7 Claims. (Cl. 340—210)

The present invention provides improved electric gauging systems in which a unitary voltage regulating device delivers pulsating electric energy, at a substantially uniform effective voltage, from a source of alternating, pulsating, or direct current of variable voltage, to operate a plurality of electrically operated gauges for measuring various physical conditions, such as liquid level, temperature, pressure, or the like. The invention further provides improvements in gauging and regulating elements per se.

More particularly, the present invention provides a gauging system in which a thermally responsive regulator receives energy from a source of variable voltage and delivers such energy, in pulsating form, the effective value of voltage of the pulsations being substantially independent of variations in the voltage of the source. The pulsating output of the regulator is delivered to gauging circuits, each including a thermally responsive gauge having sufficient heat storage capacity to enable it to integrate the regulated pulsations and further including rheostatic or equivalent gauging elements which are directly responsive to the physical condition to be measured by the corresponding thermally responsive gauge element.

For certain applications of the invention, it is desirable that the effective voltage of the regulator be substantially constant, and as described below, the present regulator is capable of such action. In other cases, however, it is desirable that the effective voltage of the regulator, though independent of variations in voltage of the source, be caused to vary in accordance with a predetermined pattern, as some function of some associated condition. For example, in automotive work, the gauge elements are, of course, subjected to rather noticeable changes in ambient temperature. The preferred gauge elements are thermal in their nature and, consequently, the rate of heat loss therefrom changes with changes in ambient temperature. On this basis, for given readings of the gauge elements, the rate at which electric energy is supplied thereto must also vary, so as to meet the changing rate of heat loss. An important aspect of the present invention, consequently, is to produce a gauging system in which the regulator automatically alters its output voltage so as to compensate for the varying rates of heat loss from the gauge elements, occasioned by changes in ambient temperature.

Accordingly, principal objects of the present invention are to provide an improved gauging system having the aforesaid characteristics, and to provide improved regulating and gauging elements for use in such a system; to provide such a system and elements therefor which are economical of manufacture and assembly and which are reliable and efficient in operation; to provide an improved thermally responsive regulator arranged to receive energy at a variable voltage and deliver such energy as a succession of pulses having an effective voltage which is substantially independent of variations in the voltage applied to it; to provide such a regulator having an effective output voltage which varies in accordance with a predetermined pattern in response to changes in an associated condition; and to provide improved rheostatic elements responsive to various physical conditions such as liquid level, temperature, pressure, or the like.

With the foregoing as well as other and more detailed objects in view, which appear throughout the following description and in the appended claims, preferred but illustrative embodiments are shown in the accompanying drawings, throughout the several views of which corresponding reference characters are used to designate corresponding parts:

Figure 1 is a diagrammatic view of a gauging system embodying the invention;

Figs. 1A and 1B are diagrammatic views of modified regulators embodying the invention;

Fig. 1C is a diagrammatic view of a modified gauging system embodying the invention;

Fig. 2 is a view in top plan, on a slightly reduced scale, as compared to Figures 3 and 4, of a preferred construction of thermally responsive regulator;

Fig. 3 is a view in vertical section of the structure of Fig. 2, taken along the line 3—3 of Fig. 4;

Fig. 4 is a view in horizontal section, taken along the line 4—4 of Fig. 3;

Fig. 5 is a fragmentary view in vertical section, taken along the line 5—5 of Fig. 2;

Fig. 6 is a view in bottom plan of an improved rheostatic element adapted to respond to the level of a liquid;

Fig. 7 is a view in vertical section of the structure of Fig. 6;

Fig. 8 is a view in vertical section, taken along the line 8—8 of Fig. 7;

Fig. 9 is a view in top plan of a rheostatic element the resistance whereof varies in accordance with temperature;

Fig. 10 is a view in longitudinal central section, taken along the line 10—10 of Fig. 9;

Fig. 11 is a fragmentary view in section, taken along the line 11—11 of Fig. 9;

Fig. 12 is a view, on a reduced scale, in top plan, of a rheostatic unit adapted to be responsive to fluid pressure;

Fig. 13 is a view in vertical section, taken along the line 13—13 of Fig. 12;

Fig. 14 is a view in top plan, of the structure of Figures 12 and 13, with the cover removed;

Fig. 15 is a view in vertical section of another form of rheostatic element adapted to respond to fluid pressures;

Fig. 16 is a view in top plan of the structure of Fig. 15, with the cover removed;

Fig. 17 is a view in side elevation, with the cover removed, of a further form of rheostatic element adapted to respond to fluid pressures;

Fig. 18 is a view in top plan of the structure of Fig. 17;

Fig. 19 is a view in vertical section of another form of rheostatic element adapted to respond to fluid pressures;

Fig. 20 is a view in top plan, but with the cover removed, of the structure of Fig. 19; and, Fig. 21 is a fragmentary view in vertical section showing further details of the structure of Fig. 19.

It will be appreciated from a complete understanding of the present invention that the improvements thereof can, in a generic sense, be embodied in electrical control systems of widely differing types, for association with widely differing types of load circuits and widely differing types of energy supply sources. The illustrated embodiments of the present invention have been specifically designed to provide for electric gauging of engine temperature, oil pressure, and gasoline supply conditions in automotive vehicles. Such specific disclosure herein is, of course, to be regarded in an illustrative and not in a limiting sense.

Considering first the system of Figure 1, the illustrative gauging circuits 10, 12, and 14 are connected in parallel with each other and receive electric energy, at a voltage regulated by regulator 16, from a source 18. The source 18 may be of various types, but when the present improvements are used in connection with automotive vehicles, source 18 may, for example, comprise a usual engine driven generator 20 and a battery 22. In line with conventional automotive practice, a voltage regulator VR is interposed between the generator and the battery and, as will be understood, serves to maintain the voltage of the latter between limits which are acceptable for many of the vehicle requirements. In practice, these limits are not close enough for satisfactory operation of desirably simple electric gauges.

The regulator 16 receives the noticeably variable output of the source 18 and delivers pulsating energy to the gauging circuits, the effective voltage of the regulator being substantially independent of variations in the voltage of the source. Under these conditions, it will be appreciated that the individual gauging circuits can utilize simple rheostatic elements 24, 26, and 28 which, in response to liquid level, engine temperature, oil pressure, or other physical condition, serve to vary the resistance of the individual gauge circuits and thereby control the current through, and consequently the positions of, the individual gauges 30, 32, and 34.

Basically, the regulator 16, as well as the other herein illustrated regulator embodiments, can be characterized as including a thermally responsive member at least a portion of which tends to move as a consequence of changes in the temperature thereof. Current modulating means are associated with this member so as to respond to the tendency to move. The current modulating means serve to increase the heating current supplied to the regulator in response to decreases in temperature thereof and vice versa. Consequently, throughout at least a predetermined range of voltages of the source, the current modulating means periodically increase and decrease the current supplied to the thermally responsive member and cause it to be maintained at a substantially uniform average temperature. On this basis, it will be appreciated that the thermally responsive member receives energy, in pulsating form, at a substantially uniform average rate. This energy rate may, of course, be expressed as $E^2/r$, E being the effective or root-mean-square voltage of the energy pulsations and $r$ being the electrical resistance of the regulator. Under any given ambient temperature condition, the electrical resistance of the regulator may, for all practical purposes, be regarded as constant. Consequently, for any given ambinet temperature condition, the effective voltage of the energy pulsations absorbed by the regulator is also substantially constant and independent of variations in the voltage of the associated source of energy. The control of the effects of ambient temperature changes, as well as the advantage which is taken thereof in accordance with certain aspects of the present invention, are discussed below.

The herein disclosed improved regulators can further be characterized in that they are adapted to have the associated gauging or load circuits connected thereto in parallel with the current consuming elements of the regulator, and subject to the current modulating means. Consequently, the load circuits also receive energy pulsations having an effective voltage which is substantially independent of variations in the source voltage. The arrangement is such that load curents have no appreciable heating effect upon the thermally responsive element. Consequently, the effective voltage established by the regulator is independent of the relative magnitudes of the heating and load currents, and the load currents may be individually varied at random without affecting in any way the action of the regulator.

As diagrammatically shown in Figure 1, the regulator 16 comprises a thermally responsive tri-metallic element 40, which carries a heater winding 42. One terminal of winding 42 is grounded as indicated, and the other terminal thereof is electrically connected to the element 40. In this instance the current modulating means comprises a pair of contacts 44 and 46 and a shunt resistor 70. The element 40 carries the movable contact 44, which normally engages the fixed contact 46. Contact 46 in turn is connected to the source 18 through a control switch 48 which may, for example, be controlled concurrently with or be a part of the ignition switch of the associated vehicle.

With this relation, it will be appreciated that closure of switch 48 completes the circuit from the source 18, through contacts 46—44, the body of the element 40 and the heater winding 42 to ground. Completion of this circuit supplies heat to the element 40 and causes its temperature to rise. As is discussed in more detail below, the electrical resistance of the element 40 is so low that for all practical purposes, all of the heating effect can be considered as being derived from the winding 42. With this relation, element 40 can also serve as a conductor of the gauging and heating currents.

Upon being heated, the element 40 warps and separates the contacts 44 and 46, interrupting the just traced circuit and also reducing the heating effect to a value determined by shunt resistor 70. The reduction in heating effect enables the element 40 to cool and restore the contacts 44—46 to closed condition. So long, accordingly, as switch 48 remains closed, contacts 44—46 are periodically opened and closed and the heating current is correspondingly modulated. Consequently, the element 40 acquires a temperature just high enough to hold the contacts 44—46 in a condition of incipient closing and opening. As described in connection with Figure 3, this critical temperature can be variously determined, as an incident to manufacture, by adjusting the position of the fixed contact 46 relative to the contact 44, so as to correspondingly determine the initial pressure between these terminals. For automotive work, it is usually preferred to adjust the regulator 16 to provide a regulated or effective voltage of about 5 volts. Consequently, as aforesaid, and neglecting ambient effects, regulator 16 acts to receive from the source 18 an amount of electric energy, in pulsating form, which has a substantially uniform heating value. On this basis, and since, over any period of time, the wattage input to the regulator heater ($E^2/r$) is at a constant rate, it is evident that the regulator 16 breaks up the energy supplied by source 18 into a succession of pulses having an effective voltage which is independent of variations in the voltage of the source 18.

The voltage impressed across winding 42, between terminal 44 and ground is, of course, equal to the voltage impressed upon the individual gauging circuits 10, 12, and 14. These circuits, therefore, are supplied from the source 18 with pulsating energy at an effective voltage which is substantially independent of variations in the voltage of the source 18. Regulator 16 thus effectively serves as a regulator of the voltage impressed across the gauging circuits, and currents drawn by the individual gauging circuits are thus independent of variations in voltage of the source 18.

In the interest of economy of manufacture, the element 40 desirably serves as a conductor of both the heating and load currents, so that the winding 42 as well as the load circuit can be directly connected to the element 40, as by a spot welding operation or otherwise. In this event, it is important, as aforesaid, that the electrical resistance of the element 40 be so low that for all practical purposes all heating effect thereon can be regarded as derived from the winding 42. In the preferred practice of the invention, the element 40 is of tri-metallic form. It may, for example, embody outer elements composed, respectively, of a material having a high coefficient of expansion, such as a comparatively high chromium alloy, and a material having a very low coefficient of expansion, such as Invar. The intermediate layer may be material such as copper or nickel having very low electrical resistance. Relative thicknesses of the various materials may, of course, vary. For example, a trimetallic strip having a thickness of .0095 inch may be formed of an Invar strip having a thickness of approximately .0025 inch, an intermediate layer approximately .0025 inch thick and a high coefficient outer layer approximately .0045 inch thick. The intermediate layer, being on the neutral axis of the composite strip, does not materially interfere with deflection thereof, but it does afford a good low resistance conductor through the strip. Additionally, the intermediate high conductivity layer improves the heat conductivity characteristics of the strip and increases the speed of response thereof.

In the broader aspects of the invention, any of a variety of well-known electroresponsive constructions can be employed in connection with the individual gauges 30, 32 and 34, the diagrammatically shown movable elements whereof may consequently function to commutate circuits, provide visual indications or otherwise. Preferably these gauges are of the well-known temperature compensated, thermostatic type. Each gauge employs a bimetallic element which carries a heater winding. Warping of the bimetallic element actuates an indicator needle in any well-known manner. It will be appreciated that the use of thermostatic gauges is advantageous in that they inherently have some heat capacity which can be matched with the performance of the regulator so that the individual pulsations introduced by the latter into the current supply are integrated by the gauges. In typical cases, the pulsating rate may be between 60 and 90 pulsations per minute. The matched thermal capacities provide a synchronism of displacement of the indicator bimetal with that of the regulator following initial closure of the switch 48 and thereby provides for an accelerated pointer travel to the final point of indication, before the regulator starts its pulsing regulation of voltage. This action is desirable for quicker readings and arises from that fact that during the initial period of lag the gauges and responsive member of the regulator are subject to the full applied and unregulated voltage.

The liquid level unit 24 in Figure 1 is diagrammatically shown as comprising a resistor 50 disposed to be variably engaged by a grounded contact 52 which in turn is suitably connected to a float 54. As the liquid level rises, the amount of resistor 50 included in gauging circuit 10 is correspondingly reduced, which action, of course, increases the current drawn by the coresponding indicator 30. This current increase raises the temperature of its associated bimetal and causes a corresponding travel of the gauge needle. A reverse action is, of course, caused by the lowering of the liquid level.

In the temperature measuring circuit 12, gauge 32 is connected to ground through a resistor 60 having an inverse temperature coefficient of resistance. Various materials are acceptable for this purpose, one usable material being sold under the trade name "Thermistor." Resistor 60 is, of course, located in a region the temperature of which is to be measured and changes in temperature correspondingly affect the position of the needle of the corresponding gauge 32.

In the fluid pressure responsive gauging circuit 14, the gauge 34 is connected to ground through a variable resistor, the value of which is governed by fluid pressures acting against a diaphragm 62. These pressures act through a lever 64 to adjust a contact 66 along resistor 68.

Before proceeding to a detailed description of the herein illustrated embodiments of the above diagrammatically shown elements 24, 26, and 28, it is noted that, if desired, the regulator can be so arranged that the current impulses vary gradually between finite upper and lower values instead of abruptly between a finite upper and lower value. For example, as shown in Fig. 1A, the previously described current modulating means (44—46—70) may be replaced by a carbon pile 45, one end whereof receives a variable pressure exerted by the end of element 40. The resistance of pile 45, of course, varies inversely with the pressure exerted thereon by the element 40. In this case, it will be noticed, changes in temperature of element tend to cause it to warp but may not cause an actual warpage. In Figure 1 on the other hand, the tendency to warpage produces a finite movement of the strip.

Alternatively, if desired, resistor 70 of Fig. 1 can be eliminated, in which event the current flow is periodically interrupted. The arrangements of Figs. 1 and 1A introduce both upper and lower limits to the range of the voltage of the source 18 throughout which the regulator is effective. The lower limit is, of course, the voltage at which heat is supplied to the heater winding 42 at too low a rate to cause the contacts 44 and 46 to separate. The upper limit is, of course, that voltage at which the minimum current value, passed through the resistor 70, is high enough to maintain the bi-metallic element 40 at a temperature at which the contacts 44 and 46 are continuously separated. For similar reasons, the carbon pile arrangement also introduces both upper and lower limits of regulation. With the last-mentioned arrangement, in which current interruption is complete, the regulator has the above discussed lower limit of regulation, but has no upper limit of voltage regulation, except such as is imposed by the current carrying capacity of the heater winding 42.

Fig. 1B illustrates another of the many forms which the regulator may take, in the broader aspects of the invention. In this figure, the regulator is of the hot wire type, in which the single conductor 47 functionally replaces the previously described elements 40—42. Wire 47 is insulatedly anchored at its ends upon a base 47a which has a temperature coefficient matching that of wire 47, so that the unit is inherently compensated for ambient temperature conditions. Wire 47 also carries, in insulated relation, a movable contact 47b, which normally engages a fixed contact 47c, under the influence of the taut wire 47. Spring 47d continuously acts to separate the contacts 47b—47c. Wire 47 and the load circuit 90 are in parallel with each other and in series with contacts 47b—47c. Closure of switch 48 causes current to flow through wire 47, heating and elongating it, and enabling spring 47d to separate contacts 47b—47c. This separation interrupts the heating action and allows wire 47 to cool and contract, reclosing contacts 47b—47c against the force of spring 47d. Current thus periodically flows through wire 47, and it acquires a fixed average temperature at which contacts 47b—47c are in a condition of incipient closing and opening. As in Fig. 1 therefore (and subject only to the ambient effects discussed below), wire 47 absorbs energy at a substantially uniform rate, and, its resistance being substantially fixed, this energy is supplied at a substantially constant effective voltage. This same effective voltage is, of course, applied across the load circuit, currents in which have no effect upon the temperature of wire 47.

The system of Figure 1C illustrates certain of the many other variations which can, in the broader aspects of the invention, be made in the basic system of Figure 1. For example, it is in certain cases desirable to provide an indication, other than that afforded by the visual indicator needles, when certain of the physical conditions being measured reach critical or limiting conditions. More specifically, in connection with liquid level indicators, it may be desirable to provide a supplementary signal when the liquid level in the tank reaches a dangerously low limit.

In Figure 1C, the liquid level unit 24' is like that previously described, with the exception that it is also provided with an insulated terminal 51, disposed to be engaged by the contact 52 when the latter reaches a limiting position, in this case, the low level position. Upon being engaged, terminal 51 completes a circuit for a lamp or other indicator 53, which circuit may lead directly to the battery or may lead through the regulator 16. The direct connection is illustrated in the drawing. As will be obvious, the pressure unit 28 of Figure 1 may be similarly provided with one or more auxiliary contacts so as to provide for the giving of supplementary indications and these auxiliary contacts may be arranged, as will be understood, at both limits as well as intermediate positions, if desired.

In certain instances, it may be desirable to arrange the system so as to provide that some or all of the indicators will respond to physical conditions existing at different points. For example, in applying the present system to engines of the dual cylinder block type, it may be desirable to arrange the temperature indicator so that it is responsive to temperature conditions in both blocks. In the system of Figure 1C, it is assumed that temperature conditions in the two blocks are, in general, about the same, but that an indication ought to be given if either one of the blocks reaches an undesirably high temperature. Accordingly, in Figure 1C, one of the engine blocks is provided with one of the aforesaid temperature indicating elements 26. The other block is provided with an auxiliary temperature unit 27, which is diagrammatically shown as comprising a bimetallic element 61 which carries a heater winding 63. The element 61 also carries a movable contact 65 which is normally separated from a grounded fixed contact 67. The unit 27 may, of course, be suitably encased so that it may be introduced into the engine block into contact with the coolant liquid. Under these conditions, element 61 assumes a temperature substantially equal to the temperature of the coolant fluid and warps to a corresponding degree. So long as the temperature of the coolant fluid is below a predetermined critical value, contacts 65—67 remain open and the action of the associated indicator 32 is controlled entirely by the previously described temperature responsive unit 26. If, however, the temperature in the second block reaches a critical value, contacts 65—67 close and complete a circuit in parallel to that afforded through resistor 60. The resistance of the two circuits in parallel is, of course, less than that of either circuit individually and, consequently, indicator 32 is caused to move to a full scale position, clearly indicating the dangerous condition in the second block.

Proper action of the above described temperature indicating circuit 12′, of course, depends upon proper balancing of the resistances of the elements 32—60—63. In a typical case, the resistance of the indicator 32 may be assumed to be approximately 15 ohms and the resistance of element 60 may be assumed to vary between 100 ohms at low temperatures and approximately 10 ohms at the upper end of the scale of indicator 32. The resistance of element 63, on the other hand, may be assumed to be between 15 and 20 ohms. Neglecting the action of the auxiliary temperature unit, the aggregate resistance of elements 32 and 60 under high temperature conditions is 25 ohms. If, under these conditions, the second block reaches a dangerous temperature, the aggregate resistance of the network assumes a value of 21 ohms (assuming a resistance of 15 ohms for element 63), which is sufficiently low to cause the indicator needle 32 to move past the full scale reading position. The network resistance is still high enough, however, so that no undue warping of the indicator 32 is introduced.

Assuming that the blocks operate at somewhat different temperatures and that the second block is at the higher temperature, the resistance 60 will have a value in excess of 10 ohms at the time contacts 65—67 close. Under these conditions, the network resistance will be somewhat in excess of 21 ohms. As before, this will result in a movement of the needle past the full scale position, but not to an undue degree.

In unusual cases, the second block may reach a dangerous temperature at a time when the first block is at a quite safe temperature, corresponding, for example, to a resistance of 50 ohms for resistor 60. Under such conditions, the resistance of the network is approximately 26½ ohms which corresponds to substantially a full scale reading when the element 26 is functioning alone. Thus, by a proper selection of the relative resistance values, proper scale readings can be obtained when element 26 is acting alone; a substantially full scale reading for the second block is afforded even though the first block is at a quite low and safe temperature; and, with both blocks at a dangerous condition, a full scale reading but no undue deflection of the indicator 30, is produced when the second block reaches the critical temperature at which contacts 65—67 close. In fact, under each of the just-mentioned conditions, the range of needle movement may be confined to the range customarily marked on automotive temperature indicators as the "danger zone."

A further advantage of the dual temperature indicating arrangement of Figure 1C is that if a warning signal is produced as a consequence of the action of the auxiliary temperature unit, this warning signal persists until the temperature of the second block has fallen substantially below the temperature which produced the signal. This is for the reason that upon closure of contacts 65—67, winding 63 is supplied with current, and supplies additional heat to bimetallic element 61. Contacts 65—67, consequently, will remain closed until the temperature of bimetallic element 61, as influenced both by ambient temperature conditions, and by the heat supplied by winding 63, falls below the critical value.

Referring now to Figures 2 through 5, in a preferred form, the elements of regulator 16 are mounted within a sealed enclosure constituted by upper and lower cup-shaped members 80 and 82 which may, for example, be formed of light weight metal stampings. Preferably, and as illustrated, a sealing gasket 81 is interposed between these casing members. Element 40 is illustrated as being of U-shaped form, having one leg 84 which carries the previously identified winding 42, and a companion compensating leg 86. Leg 86 is anchored at its free end to a headed rivet 88 which serves to electrically connect leg 86 to the exposed terminal 90. It will be appreciated that changes in ambient temperature conditions have like effects upon the two legs 84—86 and cause the connecting bridge 85 to rise and fall, without (except as noted below) altering the position of the contact 44. Current flowing in winding 42, on the other hand, causes leg 84 to warp relative to leg 86 and move contact 44.

For mounting stability terminal 90 has a laterally extending, downwardly deflected leg 94 which is held in place by the companion rivet 96. Terminal 90 of Figures 2 through 5 thus corresponds to the diagrammatically shown terminal 90 in Figure 1.

As aforesaid, the free end of leg 84 carries the previously identified movable contact 44. The companion fixed contact 46 is carried near one end of the free leg 98 of a U-shaped spring strip 100. Leg 98 extends parallel to and is immediately above the leg 84, as viewed in Figures 3 and 4. The other leg 102 of spring strip 100 is anchored to the casing by the previously identified rivet 96, and is electrically connected thereby to the companion terminal 104. Terminal 104 is diagrammatically indicated in Figure 1 and is provided with an upstanding lug 106 for connection to an input lead. As in the case of terminal 90, terminal 104 is provided with a laterally extending downwardly deflected leg 108 which is anchored in place by the previously identified rivet 88.

The mounting spring strip 100 for the fixed contact 46 is preformed so that it tends to bow downwardly as viewed in Figure 3 and press against the movable contact 44, thereby preloading the element 40. The free end of leg 98 of spring strip 100 cooperates with an adjustable stop 110 which limits the downward movement thereof and which, it will be appreciated, can be adjusted as an incident to final inspection to determine the amount of preloading of the bimetallic element. This adjustment determines the temperature which the regulator must attain in order to effect a separation of the contacts, and, consequently, determines the regulated voltage of the system. Adjusting screw 110 is carried by an L-shaped mounting member 112 which is carried by the rivet 88, but is insulated therefrom, as well as from the bimetallic element 40, by insulators 114 and 116.

Rivet 88 also carries, in electrical contact with the element 40, a resistor mounting clip 118. A companion clip 120 is carried by rivet 96, in electrical contact with the mounting spring strip 100, which carries the fixed contact 46. Mounting clips 118 and 120 are thus electrically connected, respectively, to the contacts 44 and 46, and may serve as a mounting for the previously identified resistor 70 of Figure 1. Clips 118 and 120 may also serve as a convenient means of connecting a condenser or other means across contacts 44—46, for the purpose of suppressing any tendency to cause radio interference.

As previously noted, one end of heater winding 42 is spot welded or otherwise electrically connected at 122 to the bimetallic leg 84, and the other end is correspondingly grounded to the casing 80 at 126. The casing as a whole may be mounted, and grounded, by bracket 83.

Coming now to a consideration of the effect upon the elements of the present system, of substantial changes in ambient temperature, it will be appreciated that, as aforesaid, the regulator 16 acts to maintain a leg 84 thereof at a substantially uniform average temperature, just high enough above ambient temperature to maintain contacts 44—46 in a condition of incipient opening and closing. The rate of exchange of heat between any two bodies (for example, trimetallic element 40 and its enclosing casing) is, of course, proportional to the difference between the fourth powers of the respective absolute temperatures of the bodies. On this basis, the rate of heat loss from leg 84 increases with increases in ambient temperature, and vice versa. Consequently, in order to maintain the aforesaid average temperature of leg 84, the rate at which electric energy ($E^2/r$) is supplied to winding 42 must increase with increases in ambient temperature, and vice versa.

Assuming that the resistance of winding 42 is independent of ambient changes, it will be appreciated that this increase in wattage is accomplished by an increase in the effective voltage of the energy pulsations received by winding 42. More particularly, the ratio of the effective voltage at two different ambient temperatures is equal to the square root of the ratio between the wattage requirements of the regulator at the same two ambient temperatures.

The rising or falling effective voltage characteristic of the regulator, resulting from the increase or decrease in wattage requirements of the regulator, which accompany increases or decreases in ambient temperature can, of course, be increased by utilizing a heater winding 42 which has a positive temperature coefficient of resistance. This is because increases in resistance of the winding 42, for any given wattage requirement, must be accompanied by an increase in the effective voltage of the regulator, and vice versa.

Also, the aforesaid rising or falling voltage characteristic of the regulator may be increased or decreased by adjusting the length of the compensating leg 86 relative to the length of the operating leg 84 so as to, in effect, over or undercompensate the regulator. More particularly, if compensating leg 86 is shorter than leg 84, the regulator would, in the absence of the varying rate of heat loss occasioned by ambient changes, have a voltage characteristic which falls in response to increases in ambient temperature, and vice versa. Conversely, if leg 86 is longer than leg 84, the regulator would, even in the absence of the changed rate of heat loss, have a rising voltage characteristic in response to increases in ambient temperature, and vice versa.

It will be appreciated, therefore, that the normal rate of change in the effective voltage of the regulator, occasioned only by the varying rate of heat loss, can be either increased, reduced, or, in fact, reversed, depending upon the temperature coefficient of resistance of the winding 42 and the relative proportioning of the trimetallic legs 84 and 86.

It will be appreciated that the wattage requirements of the gauge elements 30, 32 and 34 are affected by changes in ambient temperature in the same general sense that the regulator 16 is affected thereby. These gauge elements are shown only diagrammatically in the drawing, but it will be appreciated that they preferably embody U-shaped bimetallic elements like the element 40 and are similarly mounted. That is, one end of the compensating leg is anchored and the gauge needle responds to movements of the end portion of the other leg. A given gauge reading, of course, requires that the operating leg, which carries the associated heater winding, attain a temperature which exceeds the temperature of the compensating leg by a predetermined amount. Because of the varying rate of heat loss which accompanies changes in ambient temperature, electric energy must be supplied to the heater winding at a corresponding variable rate in order to produce a gauge reading which is independent of the changed rate of heat loss. Assuming the heater winding has a zero temperature coefficient of resistance, the ratio of applied voltages required to produce the same gauge reading at two different ambient temperatures is, as before, equal to the square root of the ratio of the wattage requirements at such two ambient temperatures.

In the regulator, as aforesaid, the temperature coefficient of resistance of the heater wire and the relative lengths of the compensating and operating legs can be varied rather freely to achieve a desired voltage characteristic, since the regulator does not function over a range of values, but is constrained to operate at a single position determined by the setting of the adjusting screw 110. The gauge elements, on the other hand, are required to operate over a wide range of bimetal displacement and it is preferable therefore to separately treat the two related but somewhat independent ambient effects, i. e. the tendency to displacement of the bimetals, and the radiation losses. More particularly in the design of gauge elements it is preferred to adjust the leg lengths so that at zero readings the gauge is independent of ambient changes. Depending upon certain physical characteristics of the gauges, this compensation at zero reading may require that the operating and compensating legs be of the same or slightly different lengths. At the zero reading, the rate of energy input is of course very low and consequently radiation losses can be neglected.

For any given ambient temperature, the required operating temperature of the operating leg of the bimetallic element associated with each gauge element, of course, varies substantially between zero and full scale readings. For example, in an illustrative case, the gauging current may vary between 60 milliamperes and 200 milliamperes. The rate of heat loss at the high end of the scale is consequently much greater than the rate of heat loss at the low end of the scale. These differing rates of heat loss and all other variables affecting the calibration of the gauge, at any given ambient temperature, may be entirely compensated for by proper calibration of the gauge dial. Similarly, and preferably, these effects are compensated for in the design of the associated variable resistors such as 50 or 68. As is described below in connection with Figures 6 through 21, these variable resistors are wound in a generally tapering form. This tapering form takes into account the fact that the movements of the associated contact fingers may not be linear with respect to the physical changes which produce them and also takes into account the aforesaid change in rate of heat loss and variables, between zero and full scale readings. This compensation thus enables the use of linear scales on the corresponding indicators.

Strictly speaking, a given percentage increase in voltage applied to a gauge element, if just sufficient to compensate, at the low end of the scale, for a given change in ambient temperature, may not quite fully compensate for the same change in ambient temperature at the full scale reading. However, any such error would be small and the design factors of the gauge may be so chosen that the compensation is closest at selected points, such as at the low end of the scale, at an intermediate point, or at the upper end of the scale; and is acceptable throughout the entire scale.

From the foregoing it will be appreciated that in a system employing several thermally responsive gauge elements, the individual gauge elements may be so designed that the same percentage change in the voltage requirements of the corresponding gauging circuits serves to at least substantially eliminate the effects of changes in ambient temperature. On this basis, and in accordance with the present invention, the regulator 16 is designed to produce this required change in its effective output voltage in response to changes in ambient temperature. In other words, the voltage characteristic of the regulator is adjusted to match the changing voltage requirements of the gauging circuits in order to at least in large part and to a commercially acceptable degree eliminate the effects of changes in ambient temperature.

It will be obvious that the foregoing remarks as to the effects of ambient temperature on the regulator 16, the control thereof, and the advantage which may be taken thereof, apply with equal emphasis to the other forms of regulators disclosed herein.

Referring now to Figures 6, 7 and 8, a preferred construction of liquid level unit 24 is illustrated as comprising a main casing portion 130 composed of a cup-shaped stamping 132 and a cover 134 therefor. Casing 130 is carried by a mounting plate 136, which is adapted to be permanently secured in place on the associated liquid container such as the gas tank of an automobile.

The wall of the cup-shaped casing member 132 is apertured to receive a bearing element 138, which rotatably journals a crank 140, the exposed portion of which is adapted for connection in any suitable manner, to a float (not shown). A triangular shaped stop member 142 is also carried by the casing portion 132, and is provided with shoulders 144 and 146, which act as limits to the up and down swinging movements of the arm 140. The parts are shown in the nearly full position, the low level position being indicated by dotted lines.

The inner crank arm 148 carries the previously identified contact 52, which is mounted at the free end of a spring-like supporting member 150. Member 150 in turn is riveted or otherwise permanently secured to the crank arm 148. Contact 52 is electrically grounded by a flexible grounding strip 152, the free end whereof is secured to the wall of the casing member 132 by a rivet 154. Rivet 154 also serves as a mounting for one end of a resistor mounting member 160 of arcuate form. The other end of mounting member 160 is secured to the terminal stud 162. Mounting member 160 carries a spirally wound piece of resistance wire one end of which may, if desired, be grounded to the casing by rivet 154 and the other end whereof is electrically connected to the stud 162.

More particularly, mounting member 160 comprises a Bakelite or other insulating backing member 161 and an inner winding carrying member 163. The upper ends of elements 161—163 are apertured to fit over the reduced inner end of the stud 162. This inner end of stud 162 is headed over, clamping elements 161—163, as well as the end of resistor 50, between conductive washers 165 and 167, thus completing the mounting for the resistor 50 and also electrically connecting it to the stud 162.

The aligned apertures in the casing member 130 and the mounting plate 136 receive, respectively, insulators 169 and 171. The outer periphery of insulator 169 is noncircular, and a nonrotative connection between it and casing member 132 is afforded by striking one or more tongues 132a from the body of the latter. The inner periphery of insulator 169 is polygonal and receives the correspondingly shaped portion of stud 162. Insulator 171 may be and preferably is formed of a synthetic material which normally forms a tight seal around the stud, but which tends to swell and increase the effectiveness of the seal in the event gasoline or similar liquids come in contact with it. Externally of the casing an insulating washer 173 is interposed between mounting plate 136 and the clamping nut 172 which is threaded onto terminal 162. With this relation, it will be appreciated that terminal 162 is electrically connected to one end of resistor 50 but that these elements are insulated from the housing except through contact 52. These elements may be additionally electrically connected to the housing through rivet 154, in the event the lower end of the resistor 50 is connected to the latter.

The mounting plate 136, of course, has a fluid-tight connection with the liquid container, but the balance of the liquid level unit is not required to be liquid-tight. Consequently, no provision need be made for sealing the crank bearing.

The rheostatic and crank elements of the liquid level unit are, of course, initially assembled within the casing portion 132, and this subassembly is connected to the mounting plate 136 by threading nut 172 onto the terminal stud 162. Before application of the cover 134, the unit is tested and adjusted so as to insure that for given float positions, contact 52 engages resistor 50 at the proper point. These adjustments are readily made by bending the inner crank arm 148. The assembly is completed by applying the cover 134, which is held in place by bending over one or more ears 170 provided on the case.

It will be noted that the float arm 140 may be subject to rapidly fluctuating positions in operation which movements are, of course, communicated to the associated rheostat contact 52. Thus, the value of resistor 50 included in the liquid level unit circuit varies more or less continuously and at random, but has an average position which is a measure of the height of the liquid in the container. These rapidly fluctuating and random variations in the value of resistor 50 have no noticeable effect upon the position of the needle of the corresponding indicator 30, in view of the thermal lag embodied in the latter.

Referring now to Figures 9, 10, and 11, a preferred construction of temperature responsive unit 26 is illustrated. In these figures, the previously identified variable resistor 60 is shown as being of flat circular, disklike form, and is interposed between a pair of lead or equivalent disks 180 and 182, which improve the thermal conductivity of the assembly. Disk 180 directly engages the base of the sleevelike, electrically conductive, externally threaded, outer body 184, and thus serves as a grounding connection for one terminal of the resistor 60. The other lead disk 182 directly abuts a brass or equivalent pressure disk 186. Disk 186 has a reduced neck over which one end of a pressure spring 190 is fitted. The other end of spring 190 is fitted over the reduced end 192 of the ungrounded terminal 194. The enlarged flanged body portion 196 of terminal 194, is spaced from the body 184 by an insulator 198. A companion insulator 200 bears against the opposite face of the terminal portion 196, and is held in place by turned in ears 202 formed on the body 184.

The insulator 200 is provided with ears 203 which are received in slotlike spaces between the turned over ears 202, and interlock therewith to prevent relative rotation between the insulator 200 and the body 184. A nonrotative connection between insulator 200 and the terminal 194 is provided by the squared opening 195, and squared boss 197, provided in and on these elements. With this arrangement, it will be appreciated that any rotative forces applied to the terminal 194 when a nut or other element is threaded thereon, for the purpose of connecting a wire thereto, do not cause the terminal to rotate relative to the body 184.

The spring 199 serves not only as an electrical connection between the terminal 194 and the resistor 60, but also protects the resistor 60 during assembly, and prevents the resistor from being subjected to an undue compressive force. It will be appreciated that in manufacture, resistor 60 may, because of manufacturing tolerances, be subjected to slightly different degrees of spring pressure. It is found in practice, however, that the resistor 60 has a resistance characteristic which, throughout a wide range of applied pressures, is substantially uniform. Slight differences in pressure encountered as a consequence of these manufacturing tolerances, accordingly, have no appreciable effect on the resistance of the resistor 60.

It will be appreciated that the electrical circuit through the unit 26, extends from the terminal 194, through the spring 190, and thence through disks 186, 182, and 180, and the variable resistor 60, to the grounded body 184. Body 184 may, of course, be threaded into an aperture provided therefor and which leads into the water jacket of the associated engine.

In order to minimize changes in the temperature of the water jacket, or other body into which the unit is threaded, from influencing the temperature of the resistor 60, as it responds to coolant temperature, the wall portion 184 is of reduced thickness.

Referring now to Figures 12, 13, and 14, a preferred construction of fluid pressure responsive unit 28 is shown, as comprising a threaded tubular body 210, having a bore 212 which may be and preferably is provided with a restricted section 214. Body 210 is, of course, adapted to be threaded into the oil system of the associated vehicle so that the bore 212 is in communication with the pressure fluid. Body 210 also serves as a grounding connection for the resistor 68. Body 210 is fixed to a dished circular member 216 which carries the previously mentioned flexible diaphragm 62. Diaphragm 62 is clamped between member 216, and a downwardly presenting cup-shaped spring housing member 220, which is assembled to the member 216 by inwardly turning the terminal flange thereof as indicated at 222. A coil spring 224 is caged between the base of member 220 and the base of an upwardly presenting spring cup 226. Cup 226 also carries a cup-shaped crank operating member 228, the upper surface of which has direct sliding contact with the reversely bent end 230 of crank 64. Preferably, the upper surface of member 228 is ground or otherwise finished to minimize the frictional resistance of this sliding movement.

Downwardly turned fingers 221 on member 220 and the rim 227 of cup 226 act as locators for spring 224. The rim 227 of cup 226 also acts as a limit stop for cup 226.

Preferably and as illustrated, the crank 64 is formed of a continuous length of rodlike stock, the intermediate body portion 234 of which is straight, and is rotatably journaled in spaced bearings 236 and 238 carried by member 220. One end of the straight body portion 234 is joined to the operating end 230, by the rebent portion 240. The other end of the straight portion 234 is joined to the contact operating end 242 by similarly rebent portions 244.

With the foregoing arrangement, it will be appreciated that the flexible diaphragm 62 serves simply as a fluid-tight seal between the bore 212 and the interior of the spring housing 220. Spring 224 continuously urges the spring cup 226 and element 228 downwardly. Crank 64 is provided with a torsion spring 246 which causes it to follow the downward movements of element 228. Fluid pressures introduced through the bore 212, of course, urge element 228 upwardly against the force of spring 224 and any such upward movements cause a corresponding upward movement of crank 64. The position of the crank 64 is, therefore, at all times a measure of the fluid pressure acting on the oil below the diaphragm 62.

The operating end 242 of crank 64, carries the previously identified contact 66 which has rubbing contact with the arcuately formed resistor 68. Contact 66 is, of course, grounded to the casing and body 210 through crank 64, spring 246, spring 224, member 220, and disk 216. Resistor 68 is wound on a mounting member 250, of arcuate form, like the previously described member 160 of Fig. 7. Member 250 is held in place by an arcuate support 252 which forms one wall of an auxiliary housing member having side wall portions 254 and 256. The side wall portions are provided with laterally turned notched feet 258, through which tongues 260 struck from the body of the spring housing 220 extend to secure these members in place. The upper end of the resistor 68 is electrically connected to the mounting stud 262, which is otherwise insulated from the housing structure. The lower end of resistor 68 may either be insulated from or grounded to the casing and the body 210. The other casing 264 has a flared base 266, and is secured in place by inwardly turning the marginal flange portion 268 thereof. A nut 270 threaded on the terminal stud 262 completes the assembly. Preferably and as illustrated, the interior of the outer casing 264 is vented as indicated at 272. This vent may be and preferably is of the type that is self sealing in the event the associated liquid, such as oil, comes in contact therewith. Thus, if the diaphragm 218 fails, and thereby introduces a possibility of leakage through the unit, vent 272 automatically seals itself off, preventing this failure from causing a loss of the liquid.

The remaining embodiments of the invention, shown in Figures 15 through 21, illustrate fluid pressure units which employ Bourdon tubes as the pressure receiving elements. In each illustrated case, the Bourdon tube is of helical form, which facilitates manufacture. The Bourdon stock is wound in the form of a long helix and sections thereof individual to each unit are simply cut from the complete length.

Referring first to Figures 15 and 16, the resistor 68a is wound on a flat support 280 which is carried by the enlarged head 282 of the threaded body 284. The moving contact 66a is carried at the end of a springlike member 286, which in turn, is fixed to or formed integrally with an arm 288. Arm 288 is pivotally mounted on a post 290 which rises from the base 282, by means of a screw 292. A short link 294 interconnects arm 288 with one end of the Bourdon tube 296, and may be received in any of a series of mounting holes 298 in the arm 288, in order to provide for adjustment of the range of movement of contact 66a. Bending link 294 affords an adjustment of the zero position of contact 66a.

The other end of the Bourdon tubes 296 is fixed to the enlarged base 300, associated with the previously identified post 290. The base 300 and the post 284 are bored as indicated at 302 and 304. Bore 302 directly communicates with the interior of the Bourdon tube 296.

With the foregoing relation, it will be appreciated that changes in fluid pressure introduced through the bore 304, tend to wind or unwind the Bourdon tube 296, and that these movements are communicated to contact 66a through link 294 and arm 288. The element is shown in Figure 16 in a position corresponding to minimum pressure, in which all of resistor 68a is included in the associated gauge circuit. Increases in pressure thus cause contact 66a to move away from the illustrated end position, towards the other end of resistor 68a.

The terminal stud 310 is initially assembled with but insulated from the outer casing 312. When the latter is applied to the flange 282 of the plug, the enlarged head of the stud 310 is caused to bear against a spring finger 314, which is electrically connected to the resistor 68a by a rivet 316. It will be appreciated that contact 66a is grounded to the base of the unit through post 290. Stud 310 is insulated from the housing 312 by insulators 311 and 313. Insulator 313 nonrotatably receives stud 310 and is nonrotatively connected to the housing 312.

The embodiment shown in Figures 17 and 18 is much the same as that of Figures 15 and 16 with the exception that the resistor assembly 322 is mounted on a plate 324 which rises vertically from, and is secured by rivets 326, to a plate 328 which is ring staked to the threaded body 330. The fixed end of tube 320 is anchored to the upper portion of body 330. As before, the movable contact 66b is carried by an arm 332, which is pivotally connected to the post 334, constituted by the reduced upper end portion of the plug body 330. As before, accordingly, contact 66b is grounded through the body 330, and the resistor 68b is electrically connected to a spring-like contact finger 336. A housing and stud assembly corresponding to elements 310 and 312 of Figure 15 is used to complete the assembly, which action brings the finger 336 into electrical contact with the stud corresponding to stud 310.

In the remaining embodiment shown in Figures 19, 20, and 21, the resistor assembly 68c extends circumferentially of the central post 340, and is supported therefrom by means of an arm 342 which is fitted over a reduced portion 344 thereof. The end section 346 of post 340, which is bored to communicate, through a short tubular section 348, with the interior of the Bourdon tube 350, is press fitted into a counterbore provided at the upper end of the plug body 352. The dished base 354 of the unit is directly secured to the upper end of the plug body 352.

One end of the resistor 68c is electrically connected, by a rivet 356, to a spring finger 358 which, as in the case of Figures 15 and 16, is adapted to engage the inner end of the insulated terminal stud 360, when the assembly, comprising this stud and the outer casing 362, are put in place. The moving contact 66c is formed at the end of a U-shaped springlike member, which in turn, is carried by an operating arm 364. Arm 364 is pivotally connected to and grounded by the upper end of the post 340 and has a laterally turned portion 366, which is fixed to the free end of the Bourdon tube 350. The fixed end of the Bourdon tube 350 is held in place by a mounting tab 368 struck from the previously identified mounting bracket 342. A limit to the movement of arm 364 is afforded by a pin 343 that is set into the post 340.

Certain of the inventions described and disclosed in the present application are also described, disclosed and claimed in others of my applications including my application Serial No. 658,888, filed May 13, 1957, entitled "Electrical Control Apparatus"; my application Serial No. 476,504, filed December 20, 1954, entitled "Liquid Level Indicating Device"; my application Serial No. 476,505, filed December 20, 1954, entitled "Temperature Indicating Apparatus and System"; my application Serial No. 476,506, filed December 20, 1954, entitled "Pressure Indicating Device"; my application Serial No. 476,507, filed December 20, 1954, entitled "Pressure Indicating Device"; and my application Serial No. 526,190, filed August 3, 1955, entitled "Voltage Regulating Device."

Although several specific embodiments have been described in detail, it will be appreciated that various further modifications may be made in the form, number, and arrangement of the parts without departing from the spirit and scope of the invention.

I claim:

1. In an electric gauging system for association with a source of electric energy having a variable voltage, a thermally responsive gauging element integratingly responsive to a variable current therethrough, means for causing the current requirements of said element to vary in a controlled manner in response to changes in ambient temperature conditions, a current modulating device responsive to a variable physical condition to be gauged and coupled to said element and effective to vary the current therethrough in response to changes in said physical condition, and a thermally responsive regulator coupled to said element and device so as to control the supply of energy from said source to said device and element, said regulator including means operable to cause said energy to be delivered to said device and element as a succession of pulsations the effective voltage whereof is substantially independent of variations in voltage of said source and means for varying in a controlled manner the voltage applied to said gauging element substantially as a direct function of said changing current requirements of said gauging element in response to changes in ambient temperature conditions.

2. An electrical gage system including a voltage regulator connected to an indicator having an electrical heater and a bimetallic actuator, means for causing the current requirements of said indicator to vary in a controlled manner in response to and as a function of changes of ambient temperature, said regulator including a pair of normally closed contacts, a heating coil connected in parallel with said electrical heater and a bimetal element operatively connected to one of said contacts for moving the same and thereby separating the contacts when the bimetal is heated above ambient temperature, and means responsive to ambient temperature and associated with said bimetal element for so modifying the action of said element as to progressively increase the periods of time during which said contacts are closed as the ambient temperature increases, and vice versa, for varying in a controlled manner the voltage applied to said indicator substantially as a direct function of said changing current requirements of said indicator in response to changes in ambient temperature conditions.

3. An electrical gage system including a voltage regulator connected to an indicator having an electrically heated bimetallic actuator leg, means including a second bimetallic leg connected to said heated bimetallic actuator leg for causing the current requirements of said indicator to vary in a controlled manner in response to and as a function of changes of ambient temperature, said regulator including a pair of normally closed contacts, a bimetal element operatively connected to one of said contacts for moving the same and thereby separating the contacts when the bimetal is heated above ambient temperature, a heating coil associated with said regulator bimetal element and connected in parallel with said indicator, and means responsive to ambient temperature and associated with said bimetal element for varying in a controlled manner the voltage applied to said indicator substantially as a direct function of said changing current requirements of said indicator in response to changes in ambient temperature conditions.

4. An electrical gage system including a voltage regulator connected to an indicator having an electrical heater and a bimetallic actuator, means for causing the current requirements of said indicator to vary in a controlled manner in response to and as a function of changes of ambient temperature, said regulator including a pair of normally closed contacts, a bimetal element having a first and second leg, said first leg being operatively connected to one of said contacts for moving the same and thereby separating the contacts when the bimetal is heated above ambient temperature, a heating coil associated with said first regulator leg and connected in parallel with said indicator, said second leg being responsive to ambient temperature and associated with said first leg to compensate in part for the effect of ambient temperature changes on said first leg, said second leg being of a different length than said first leg and means including said second leg for so modifying the action of said element as to progressively increase the periods of time during which said contacts are closed as a function of an increase in the ambient temperature, and vice versa, for varying in a controlled manner the voltage applied to said indicator substantially as a direct function of said changing current requirements of said indicator in response to changes in ambient temperature conditions.

5. An electrical gage system including a voltage regulator connected to an indicator having an electrically heated bimetallic actuator leg, means including a second bimetallic leg connected to said heated bimetallic actuator leg for causing the current requirements of said indicator to vary in a controlled manner in response to and as a function of changes of ambient temperature, said regulator including a current controlling device, a bimetal element operatively connected to said device for actuating the same and thereby reducing current flow therethrough when the bimetal is heated above ambient temperature, a heating coil associated with said regulator bimetal element and connected in parallel with said indicator, and means including a bimetallic leg responsive to ambient temperature and connected to said bimetal element for varying in a controlled manner the voltage applied to said indicator substantially as a direct function of said changing current requirements of said indicator in response to changes in ambient temperature conditions.

6. An electrical gage system including a voltage regulator connected in series with an indicator having an electrically heated bimetallic actuator, said regulator including a pair of normally closed contacts in said series connection, a bimetal element operatively connected to one of said contacts for moving the same and thereby separating the contacts when the bimetal is heated to a predetermined temperature above ambient temperature, a heating coil associated with said regulator bimetal element and connected in parallel with said indicator, and said coil including a length of wire the temperature-resistance characteristics of which are so chosen to modify the action of said element as to progressively increase the periods of time during which said contacts are closed as the ambient temperature increases, and vice versa, at a rate which will substantially compensate for the varying voltage requirements of the indicator at varying ambient temperatures.

7. In an electric gauging system for association with a source of electric energy, a thermally responsive gauging element comprising an indicating arm movable in response to the difference in temperature between a pair of temperature responsive legs and including an electrical energized heating unit arranged in heat transfer relation with one of said legs, a current modulating device responsive to a variable physical condition to be gauged and coupled to said heating unit to control the current flow therethrough in response to changes in said physical characteristic, a thermally responsive voltage regulator coupled to said unit and said device to control the magnitude of the effective voltage supplied thereto, said regulator comprising a pair of temperature responsive arms and a current controlling means actuated as a consequence of a change in differential in temperature between said regulator arms, an electrically energized regulator heating unit arranged in heat transfer relation with one of said regulator arms, the other of said regulator arms being responsive to ambient temperature, circuit means connecting each of said heating units in series circuit with said regulator current controlling means, the material of said regulator heating unit being chosen to provide a temperature-impedance relationship such that the effective voltage required by said regulator to maintain a predetermined temperature differential between said regulator arms will increase as a function of the increase in temperature of said one regulator arm with increase in ambient temperature, said relationship being such that said increase in effective voltage will substantially compensate for the increased heat losses in said gauging element one leg due to increase in ambient temperature.

References Cited in the file of this patent

UNITED STATES PATENTS

| | | |
|---|---|---|
| 662,580 | Vicarino | Nov. 27, 1900 |
| 1,197,176 | Bliss | Sept. 5, 1916 |
| 1,806,796 | Gates | May 26, 1931 |
| 1,844,790 | Norviel et al. | Feb. 9, 1932 |
| 1,885,051 | Smulski | Oct. 25, 1932 |
| 2,004,421 | Smulski | June 11, 1935 |
| 2,040,217 | Smulski | May 12, 1936 |
| 2,069,509 | Stickney | Feb. 2, 1937 |
| 2,205,637 | Smulski | June 25, 1940 |
| 2,262,845 | Hartley et al. | Nov. 18, 1941 |
| 2,285,913 | Derrah | June 9, 1942 |
| 2,287,796 | Hall | June 30, 1942 |
| 2,312,917 | Lehane | Mar. 2, 1943 |
| 2,341,013 | Black | Feb. 8, 1944 |
| 2,391,992 | Malone | Jan. 1, 1946 |
| 2,403,534 | Kehse | July 9, 1946 |
| 2,466,846 | Giesler | Apr. 12, 1949 |
| 2,520,899 | Smulski | Aug. 29, 1950 |

FOREIGN PATENTS

| | | |
|---|---|---|
| 288,363 | Great Britain | Apr. 5, 1928 |
| 480,391 | Great Britain | Feb. 22, 1938 |
| 538,118 | Great Britain | July 22, 1941 |